(12) United States Patent
Zotto

(10) Patent No.: US 11,841,784 B2
(45) Date of Patent: Dec. 12, 2023

(54) DIGITAL ASSISTANT TO COLLECT USER INFORMATION

(71) Applicant: Hewlett-Packard Development Company, L.P., Spring, TX (US)

(72) Inventor: Rafael Dal Zotto, Porto Alegre (BR)

(73) Assignee: Hewlett-Packard Development Company, L.P., Spring, TX (US)

(*) Notice: Subject to any disclaimer, the term of this patent is extended or adjusted under 35 U.S.C. 154(b) by 146 days.

(21) Appl. No.: 17/417,560

(22) PCT Filed: Apr. 29, 2019

(86) PCT No.: PCT/US2019/029601
§ 371 (c)(1),
(2) Date: Jun. 23, 2021

(87) PCT Pub. No.: WO2020/222734
PCT Pub. Date: Nov. 5, 2020

(65) Prior Publication Data
US 2022/0058106 A1 Feb. 24, 2022

(51) Int. Cl.
*G06F 11/00* (2006.01)
*G06F 11/34* (2006.01)
*G06F 11/07* (2006.01)

(52) U.S. Cl.
CPC ...... *G06F 11/3438* (2013.01); *G06F 11/0745* (2013.01); *G06F 11/0754* (2013.01)

(58) Field of Classification Search
CPC ............. G06F 11/0745; G06F 11/0751; G06F 11/0754; G06F 11/3438; G06F 9/453; H04L 67/1396; H04L 67/535; G06Q 30/01; G06Q 30/015; G06Q 30/016
See application file for complete search history.

(56) References Cited

U.S. PATENT DOCUMENTS

| | | | |
|---|---|---|---|
| 8,024,660 B1* | 9/2011 | Quinn | G06F 11/3438 715/745 |
| 9,961,099 B2 | 5/2018 | Singh et al. | |
| 10,057,296 B2 | 8/2018 | Martini et al. | |
| 10,162,734 B1* | 12/2018 | Podgorny | G06Q 40/123 |
| 2013/0082916 A1* | 4/2013 | Dixit | G06F 3/011 345/156 |
| 2014/0282007 A1* | 9/2014 | Fleizach | G06F 9/453 715/728 |
| 2015/0220417 A1* | 8/2015 | Diment | G06F 11/3409 709/224 |

(Continued)

FOREIGN PATENT DOCUMENTS

| | | |
|---|---|---|
| WO | WO-2017221088 A1 | 12/2017 |
| WO | WO-2018190878 A1 | 10/2018 |

*Primary Examiner* — Marc Duncan
(74) *Attorney, Agent, or Firm* — QUARLES & BRADY LLP

(57) ABSTRACT

In example implementations, an apparatus is provided. The apparatus includes a processor and a non-transitory computer readable medium storing instructions. The instructions are executed by the processor to monitor user interaction with the apparatus, detect an abnormal user interaction with the apparatus, and activate a digital assistant in response to the abnormal user interaction that is detected. The digital assistant can collect user information related to the abnormal user interaction.

13 Claims, 5 Drawing Sheets

(56) References Cited

U.S. PATENT DOCUMENTS

| | | |
|---|---|---|
| 2016/0180352 A1* | 6/2016 | Chen .................... G06Q 30/016 |
| | | 705/7.29 |
| 2017/0006135 A1 | 1/2017 | Siebel et al. |
| 2017/0098197 A1 | 4/2017 | Yu et al. |
| 2018/0146000 A1 | 5/2018 | Muddu et al. |
| 2018/0239481 A1* | 8/2018 | Arar ..................... G06F 3/0488 |
| 2018/0248902 A1 | 8/2018 | Danila-Dumitrescu et al. |
| 2018/0260266 A1 | 9/2018 | Liu |
| 2019/0028557 A1 | 1/2019 | Modi et al. |
| 2020/0183772 A1* | 6/2020 | Bangalore ........... G06F 11/0709 |

\* cited by examiner

DIGITAL ASSISTANT TO COLLECT USER INFORMATION

BACKGROUND

Some service providers can provide computer services such as computer managed systems. The customer may pay for services and the service provider may provide hardware to the customer. The service provider may manage the hardware. In other words, the customer may not pay for the hardware, but rather pay for services to maintain and manage the hardware.

The service provider may monitor the performance of the hardware and provide predictive and prescriptive actions. For example, the service provider may perform predictive maintenance on the hardware to prevent failures, service the hardware when the hardware fails, periodically upgrade the hardware when the customer's computing needs change, and the like.

DETAILED DESCRIPTION

Figure 1:
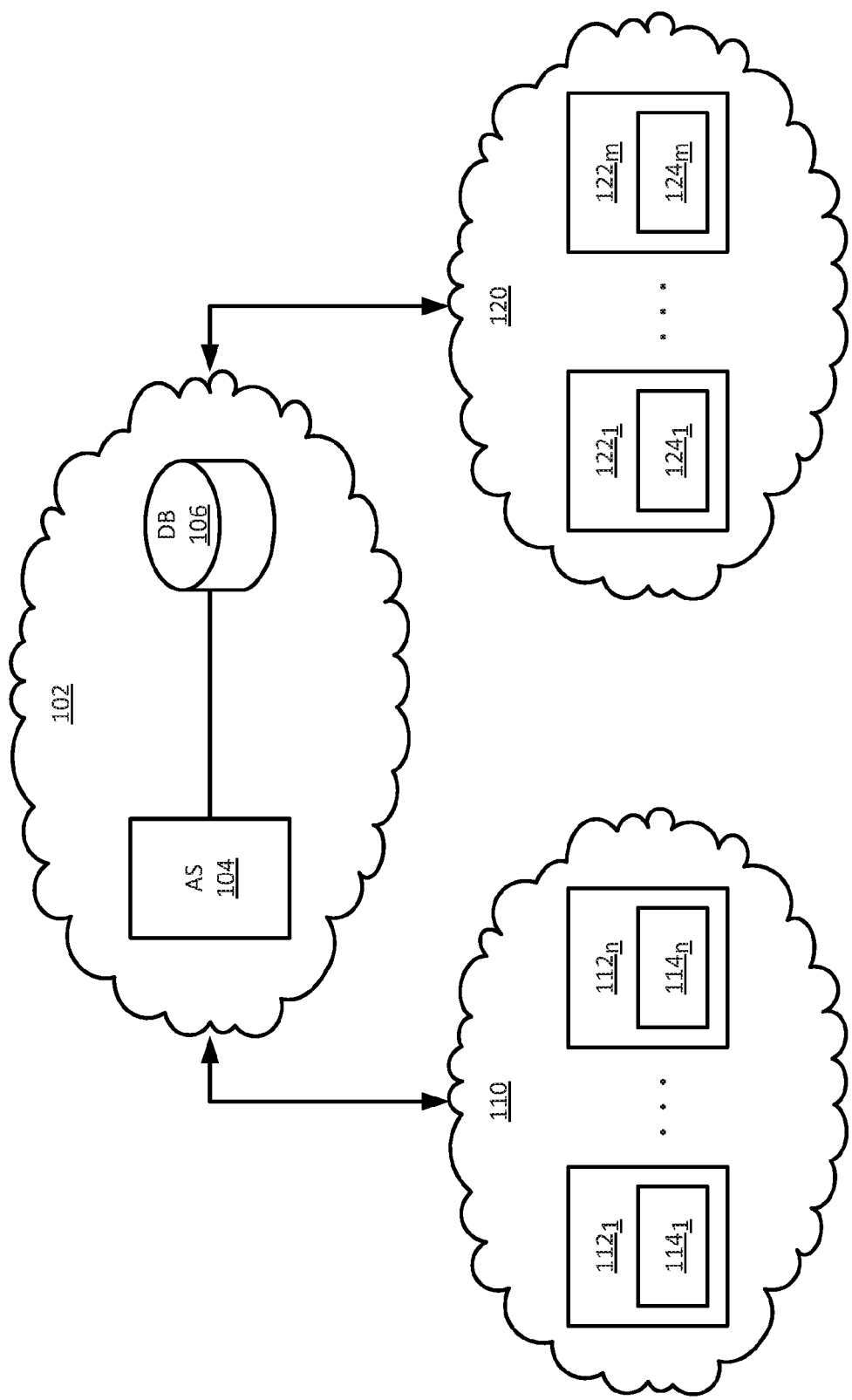
FIG. 1 is a block diagram of a managed computer system of the present disclosure.

Examples described herein provide digital assistants to collect feedback in response to detecting abnormal user interaction. As noted above, some service providers can provide computer managed systems, such as Device as a Service (DaaS). The customer may expect a certain level of performance of the hardware or computing devices in these managed computing systems. The customer may feel that the computing device is "slow" or "fast" even if the computing device is performing as expected.

In some examples, the service provider may monitor each computing device or hardware in the system and provide a performance score. For example, the processor usage, the memory usage, the usage time, the application performance, battery, thermal parameters, a system state, disk usage, and the like can all be monitored remotely. Based on these parameters a score can be assigned to each piece of hardware and overall software. Scores below a threshold may cause hardware to be fixed, replaced, and the like.

However, in some instances, monitoring the performance of the components and applications of each hardware device may not provide a complete, or accurate, evaluation of a user's experience with the hardware device. For example, a user may attempt to run an application or a video game that is beyond the capabilities of the hardware device and become frustrated when the device does not perform. In another example, a hidden software bug or network traffic may cause the computing device to underperform even though the components within the hardware are operating correctly.

As a result, the user may become frustrated and perform unusual keystrokes or unusual interaction with the computing device. For example, the user may begin repeatedly hitting the "enter" key, "ESC" key, spacebar, and the like. The user may continuously press a certain key combination (e.g., control+alt+delete) trying to terminate a set of applications that the user believes is causing a problem. The user may continuously plug and unplug a peripheral device in a universal serial bus (USB) port. The user may simply slam his fist against the keyboard and simultaneously hit multiple keys that are near one another, and so forth.

The present disclosure provides an apparatus and method that can detect these unusual behaviors that may not be detected based on monitoring the performance of the hardware device or computing device alone. In response to detecting the unusual user interaction, the computing system may launch a digital assistant to collect user feedback related to what the user is experiencing. This information may be considered a subjective score that can be combined with the objective score of the hardware performance to provide an overall score of each hardware device.

The digital assistant may provide the user information to help solve any problems the user may be experiencing and to assure the user that the computing device is operating properly. The user feedback that is collected may also help service providers troubleshoot what the user may be experiencing. For example, the user may have upgraded an application that requires more computing power and the service provider may offer to replace the user's computing device, or the application may conflict with another software component that is installed and can be removed or modified.

FIG. 1 illustrates an example managed computer system 100 of the present disclosure. In one example, the system may include a service provider network 102 and customer sites 110 and 120. The service provider network 102 and the customer sites 110 and 120 may be communicatively coupled over a communication network (e.g., an Internet protocol (IP) network). The service provider network 102 and the customer sites 110 and 120 may be remotely located from one another (e.g., physically located in different geographic locations). Although two customer sites 110 and 120 are illustrated in FIG. 1 it should be noted that there may be more customer sites or fewer customer sites.

In one example, each customer site 110 and 120 may include hardware devices or computing devices that are provided by the service provider of the service provider network 102. The service provider may monitor and manage the hardware devices for each customer site 110 and 120. For example, the customer site 110 may include computing devices $112_1$ to $112_n$ (hereinafter also referred to individually as a computing device 112 or collectively as computing devices 112). Each computing device 112 may include a digital assistant $114_1$ to $114_n$ (hereinafter also referred to individually as a digital assistant 114 or collectively as digital assistants 114).

Similarly, the customer site 120 may include computing devices $122_1$ to $122_m$ (hereinafter also referred to individually as a computing device 122 or collectively as computing devices 122). Each computing device 122 may include a digital assistant $124_1$ to $124_m$ (hereinafter also referred to individually as a digital assistant 124 or collectively as digital assistants 124). The computing devices 112 and 122 may be any type of computing device, such as a laptop computer, a desktop computer, a tablet computer, a printing device, a server, a storage device, and the like.

The service provider network 102 may include an application server (AS) 104 and a database (DB) 106. The DB 106 may store an inventory of each computing device 112 and 122 at the client sites 110 and 120. The DB 106 may also store objective scores of each one of the computing devices 112 and 122, as discussed in further details below. The DB 106 may store other information that may be transmitted to and from the computing devices 112 and 122 that are discussed below.

The AS 104 may be communicatively coupled to the computing devices 112 and 122 and may monitor the operation of the computing devices 112 and 122. For example, the AS 104 may monitor performance parameters of components within the computing devices 112 and 122. The performance parameters may include processor utilization, memory usage, a number of applications that are executed, which applications are executed, a number of hours of operation, error logs, battery performance, thermal parameters, disk usage, system states, and the like.

In one example, the AS 104 may calculate an objective score for each computing device 112 and 122. The objective score may be calculated based on the performance parameters that can be objectively evaluated and scored. The objective score may indicate to the service provider which computing devices 112 and 122 are performing correctly, which devices 112 and 122 may be malfunctioning, which computing devices 112 and 122 may be replaced, and so forth.

However, as noted above, the objective score alone may not provide an accurate assessment of how the computing devices 112 and 122 may be performing. In one example, the computing devices 112 and 122 may include the digital assistants 114 and 124. The digital assistants 114 and 124 collect user feedback and subjective scores from users in response to detecting abnormal user interaction with the computing devices 112 and 122. The computing devices 112 and 122 may also include sensors or may monitor user interaction to detect the abnormal user interaction that may cause the digital assistants 114 and 124 to be executed or launched on the computing devices 112 and 122.

In one example, the subjective scores and user feedback collected by the digital assistants 114 and 124 may be transmitted to the AS 104 in the service provider network 102. The subjective scores may be combined with the objective scores to calculate an overall score of each one of the computing devices 112 and 122. In one example, the subjective scores and the objective scores may be weighted to obtain the overall score. For example, the subjective scores and the objective scores may be equally weighted or unequally weighted (e.g., the subjective score may be worth 25% of the overall score and the objective score may be worth 75% of the overall score).

In one example, the user feedback may be provided to the AS 104. The user feedback may help provide information to troubleshoot potential errors or problems with the computing devices 112 and 122. The user feedback may provide information that may not be detected by the performance parameters of the computing devices 112 and 122.

Figure 2:
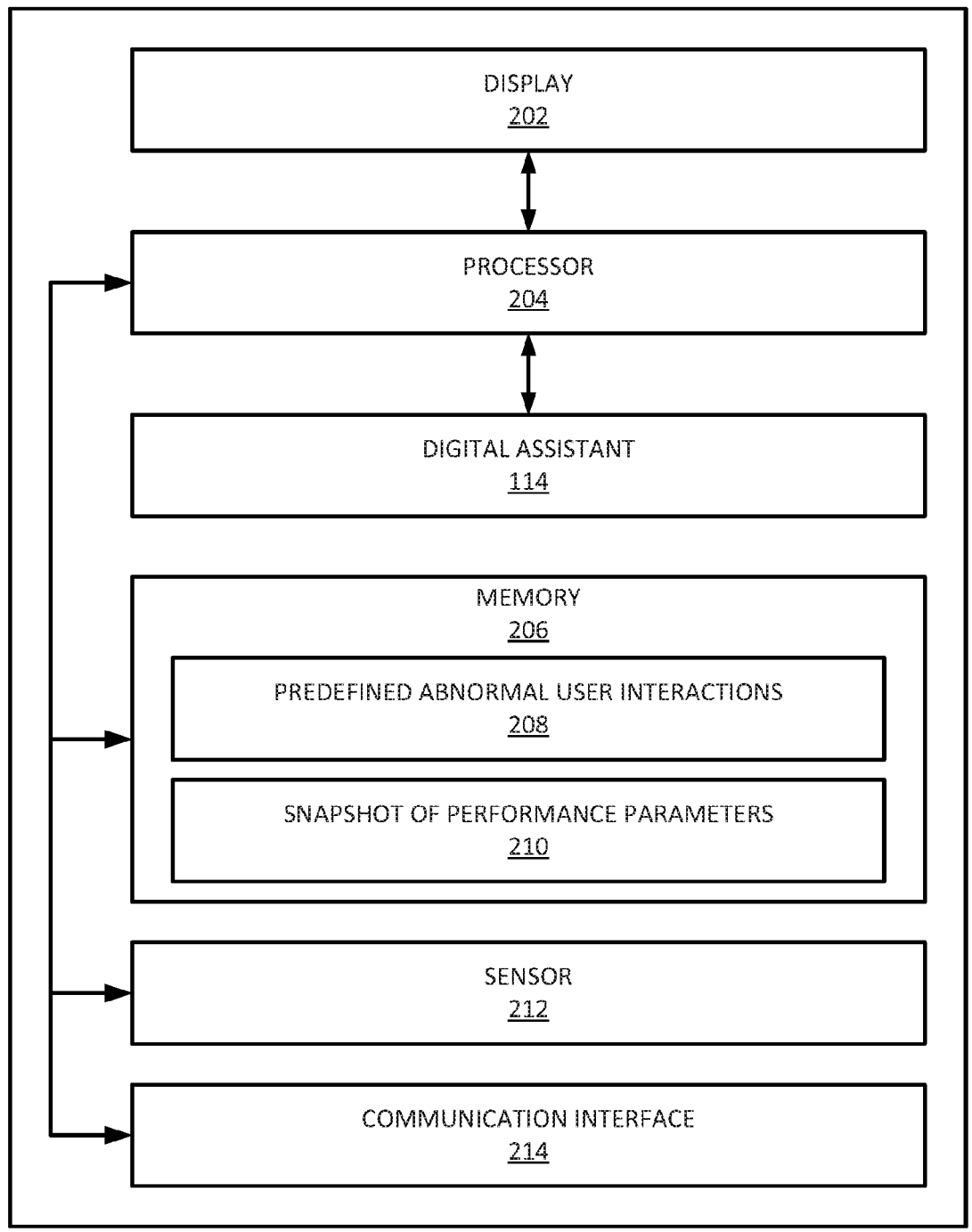
FIG. 2 is a block diagram of an example computing device within the managed computer system of the present disclosure.

FIG. 2 illustrates a block diagram of an example apparatus or computing device 112 of the present disclosure. The computing device 122 may be similar to the computing device 112 illustrated in FIG. 2.

In one example, the computing device 112 may include a display 202, a processor 204, the digital assistant 114, a memory 206, a sensor 212, and a communication interface 214. The processor 204 may be communicatively coupled to the display 202, the digital assistant 114, the memory 206, the sensor 212, and the communication interface 214. The processor 204 may execute the digital assistant 114 and/or instructions that may be stored in the memory 206. The processor 204 may also control operations of the display 202, receive signals collected by the sensor 212, and transmit or receive data via the communication interface 214.

The computing device 112 may also include additional components that are not shown. For example, the computing device 112 may include input devices such as a keyboard, a mouse, a trackpad, and the like, a graphics processor, interfaces for external devices (e.g., a universal serial bus (USB) interface), and the like.

In one example, the display 202 may be an externally connected monitor or an integral part of the computing device 112. The display 202 may be a touch screen display and also serve as an input device.

In one example, the sensor 212 may be any type of sensor that can monitor user interaction with the computing device 112. For example, the sensor 212 may be a force sensor in the keyboard, the display 202, and the like. The sensor 212 may measure an amount of force that is applied. For example, the sensor 212 may detect when a user is slamming on the keyboard or the display 202.

In one example, the communication interface 214 may be a wired or wireless communication interface. For example, the communication interface 214 may be an Ethernet port, a wireless radio, and the like. The communication interface 214 may allow the computing device 112 to establish a communication path to the AS 104, as discussed above. The computing device 112 may transmit information to the AS 104 and receive information from the AS 104 via the communication interface 214.

In one example, the memory 206 may be a non-transitory computer readable medium such as a hard disk drive, a random access memory (RAM), and the like. The memory 206 may include predefined abnormal user interactions 208 and a snapshot of performance parameters 210.

In one example, the predefined abnormal user interactions 208 may store user interactions that have been identified as being abnormal. For example, the user interactions may include a particular interaction or a number of interactions within a pre-defined time period. A user interaction may include a keystroke, a combination of keys, a touch of a touch screen display, a mouse movement, a movement on a trackpad, an insertion or a removal of an external device from an interface, and the like.

In one example, the predefined abnormal user interactions 208 may be dynamically updated. For example, the computing device 112 may periodically communicate with the AS 104 to update the predefined abnormal user interactions as the list is updated or new abnormal user interactions are defined. For example, as new sensors, peripheral devices, components, and the like are added, new abnormal user interactions can be defined.

In some examples, the digital assistant 114 may interact with the user to learn new abnormal user interactions that can be added to the predefined abnormal user interactions 208. For example, the user may provide user feedback that describes a certain interaction that may be added to the predefined abnormal user interactions 208.

Certain user interactions when performed repeatedly or in a particular direction within a predefined time period may be considered to be an abnormal user interaction. For example, when the user moves the mouse side-to-side repeatedly within a short amount of time, the user interaction may be considered an abnormal user interaction. When a user presses the enter key more than 5 times within a five second time period, the user interaction may be considered an abnormal user interaction. When a user presses a combination of keys (e.g., control+alt+delete) repeatedly more than 3 times within a ten second period, the user interaction may be considered to be an abnormal user interaction. When multiple keys that are adjacent to one another are pressed simultaneously (e.g., a user is slamming the keyboard or slapping the keyboard), the user interaction may be considered to be an abnormal user interaction. When a user inserts and removes an external device in the same interface more than 3 times within a 5 second time period, the user interaction may be considered to be an abnormal user interaction.

In another example, the sensor 212 may be used to detect abnormal user interactions. For example, when the sensor 212 detects a force applied that is greater than a threshold, the processor 204 may receive the signal from the sensor 212 and determine that an abnormal user interaction has been detected. For example, the sensor 212 may be in the keyboard and the user may slam the keyboard, which may be detected by the sensor 212. The sensor 212 may be located in the display 202 and the user may tap the display 202 with extra force out of frustration, which may be detected by the sensor 212. The user may shake the display, which may be detected by the sensor 212.

Thus, the abnormal user interaction may be detected by certain interactions with the input devices of the computing device 112 or by the sensor 212. It should be noted that the abnormal user interactions described above are provided as examples. Additional abnormal user interactions may be detected that are not mentioned by example in the present disclosure. In addition, the values provided above are provided as examples, but may be modified to fit a definition of an abnormal user interaction as desired by a service provider.

In one example, the processor 204 may monitor the user interactions with the computing device 112 and/or the signals received from the sensor 212. The monitored user interactions or signals from the sensor 212 may be compared to the predefined abnormal user interactions 208. If a match is found, the processor 204 may determine that an abnormal user interaction is detected.

In response, the processor 204 may cause the digital assistant 114 to be executed. In one example, the digital assistant 114 may interact with the user. The digital assistant 114 may indicate that an abnormal user interaction was detected and ask the user if everything is okay. If the user indicates that everything is okay (e.g., the user accidentally triggered an abnormal user interaction), then the digital assistant 114 may terminate. However, if the user indicates that there may be a problem, the digital assistant 114 may attempt to correct the problem.

In one example, the digital assistant 114 may automatically take a snapshot of the performance parameters 210, as well as any other data that may be relevant to identifying a cause of the abnormal user interaction. The digital assistant 114 may try to determine what is causing the abnormal user interaction. The digital assistant 114 may include machine learning technology or use analytical services provided by the AS 104. For example, based on the performance parameters, the digital assistant 114 may determine that a particular application has stopped responding, that a particular application is not compatible with the computing device 112, that a portion of the memory 206 has failed, that the processor 204 is being over utilized, that the network connection is slow or unavailable, and so forth.

In one example, the digital assistant 114 may attempt to correct the error or cause of the abnormal user interaction before being launched to interact with the user. In another example, the digital assistant 114 may be launched to provide information to the user regarding what may be causing a poor user experience and notify the user that the digital assistant 114 is attempting to fix the error. As a result, the user may know why the computing system 112 is not responsive while the error is being fixed.

Figure 3:
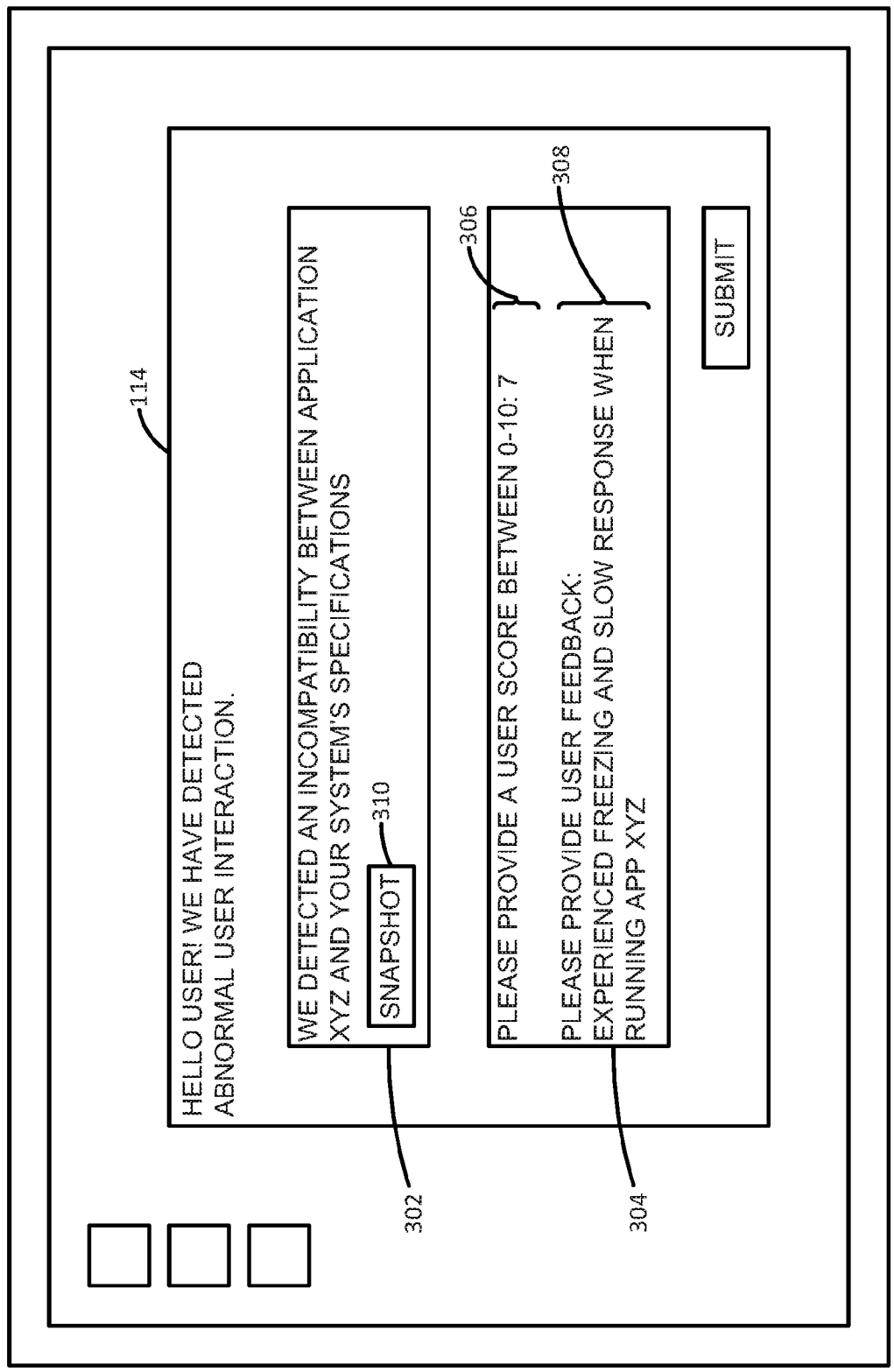
FIG. 3 is a block diagram of an example digital assistant in a user interface of the present disclosure.

FIG. 3 illustrates an example of the digital assistant 114. The digital assistant 114 may be presented as a graphical user interface in the display 202. The digital assistant 114 may interact with the user to provide information and to collect user feedback, subjective scores, and the like. As noted above, the user feedback may be transmitted to the AS 104 of the service provider to calculate an overall score based on the objective score of a computing device 112 and the subjective score collected by the digital assistant 114.

The digital assistant 114 may be executed, launched, or displayed in response to detecting an abnormal user interaction. The digital assistant 114 may provide a diagnosis of what may be causing the abnormal user interaction, may troubleshoot or fix detected errors, and may provide information to the user so that the user does not become frustrated.

For example, the computing device 112 may stop responding temporarily due to excessive memory or processor usage. The user may start repeatedly pressing the "return" key or quickly moving the mouse side-to-side. The computing device 112 may monitor the user interactions and detect that the user interactions match one of the predefined abnormal user interactions 208. In response, the digital assistant 114 may be launched. The digital assistant 114 may interact with the user to ask the user if there is a problem with the computing device 112.

In one example, the digital assistant 114 may be prioritized over all other non-essential applications (e.g., any applications that are not related to the operating system). Thus, if the computing device 112 is frozen, the non-essential applications may be automatically terminated to allow the digital assistant 114 to be executed. The digital assistant 114 may allow the user to know that the computing device 112 is properly operating.

In addition, the digital assistant 114 may include an information window 302. The information window 302 may provide to the user information related to a recent user experience or information related to a predefined time window (e.g., five minutes, 10 minutes, and the like) before the digital assistant 114 was launched. The information window 302 may indicate to the user what problems were detected, what was fixed, that the computing system 112 is about to be fixed, and so forth.

In one example, if the user indicates that there is a problem with the computing device 112, then the digital assistant 114 may take a snapshot 310 of performance parameters of the computing device 112, or any other telemetry collection process to get information that may help determine the cause of the problem. In another example, the digital assistant 114 may automatically take the snapshot 310 of the performance parameters when the abnormal user interaction is detected. The performance parameters may include processor utilization, memory utilization, a list of applications that were being executed, an amount of processor and memory utilization for each application, what external devices were connected, a current network speed, and the like.

In one example, the digital assistant 114 may analyze the snapshot 310 to determine a possible error that may be causing the abnormal user interaction and may attempt to fix the error. For example, the user may be attempting to play a video game that is not supported by the computing device 112. Thus, the computing device may freeze. The digital assistant 114 may see in the snapshot 310 that the amount of processor and memory utilization is near 100% for the video game. Thus, the digital assistant 114 may terminate the video game.

In addition, the digital assistant 114 may provide information in the information window 302. For example, the digital assistant 114 may indicate to the user that the computing device 112 is not powerful enough to run the video game. The digital assistant 114 may indicate that the video game was terminated and offer solutions to the user (e.g., request an upgraded computing device 112, suggest a different application, request upgraded components, and the like).

In one example, the digital assistant 114 may provide information in the information window 302 indicating the detected error before fixing the error. The digital assistant 114 may let the user know what will be corrected or that the computing device 112 will be restarted. As a result, the user may know that the problem is being automatically fixed or corrected.

In one example, the snapshot 310 may also be stored in the memory 206 as the snapshot of performance parameters 210. The snapshot 310 may be transmitted to the AS 104 such that the service provider may calculate an objective score of the computing device 112.

In one example, the digital assistant 114 may include a user feedback window 304. The user feedback window 304 my collect a subjective score 306 and detailed feedback 308. The subjective score 306 may be a user provided score related to the recent experience that caused the abnormal user interaction. For example, the subjective score 306 may be a numerical score between 0 and 10 or any other scoring metric.

In one example, the detailed feedback 308 may allow a user to type details of what the user experienced. The detailed feedback 308 may allow a service provider to conduct further troubleshooting that may otherwise not appear in the snapshot 310 alone. For example, the snapshot 310 may make the computing device 112 appear to be malfunctioning. However, the detailed feedback 308 may indicate that the user was attempting to run an application that was not compatible with the computing device 112.

In one example, if the subjective score 306 is not provided, the AS 104 may assign a user score based on the detailed feedback 308. For example, sentiment analysis may be performed on the detailed feedback 308 to assign a subject score that can be used to adjust the objective score and update or calculate the overall score described above.

It should be noted that FIG. 3 illustrates one example of a digital assistant 114. The digital assistant 114 may include animated graphics to provide a richer user interaction. The digital assistant 114 may appear as an avatar that may speak to the user. Rather than using windows, the digital assistant 114 may speak to the user via speakers of the computing device and allow the user to speak to the avatar using a microphone that is part of the computing device 112.

Figure 4:
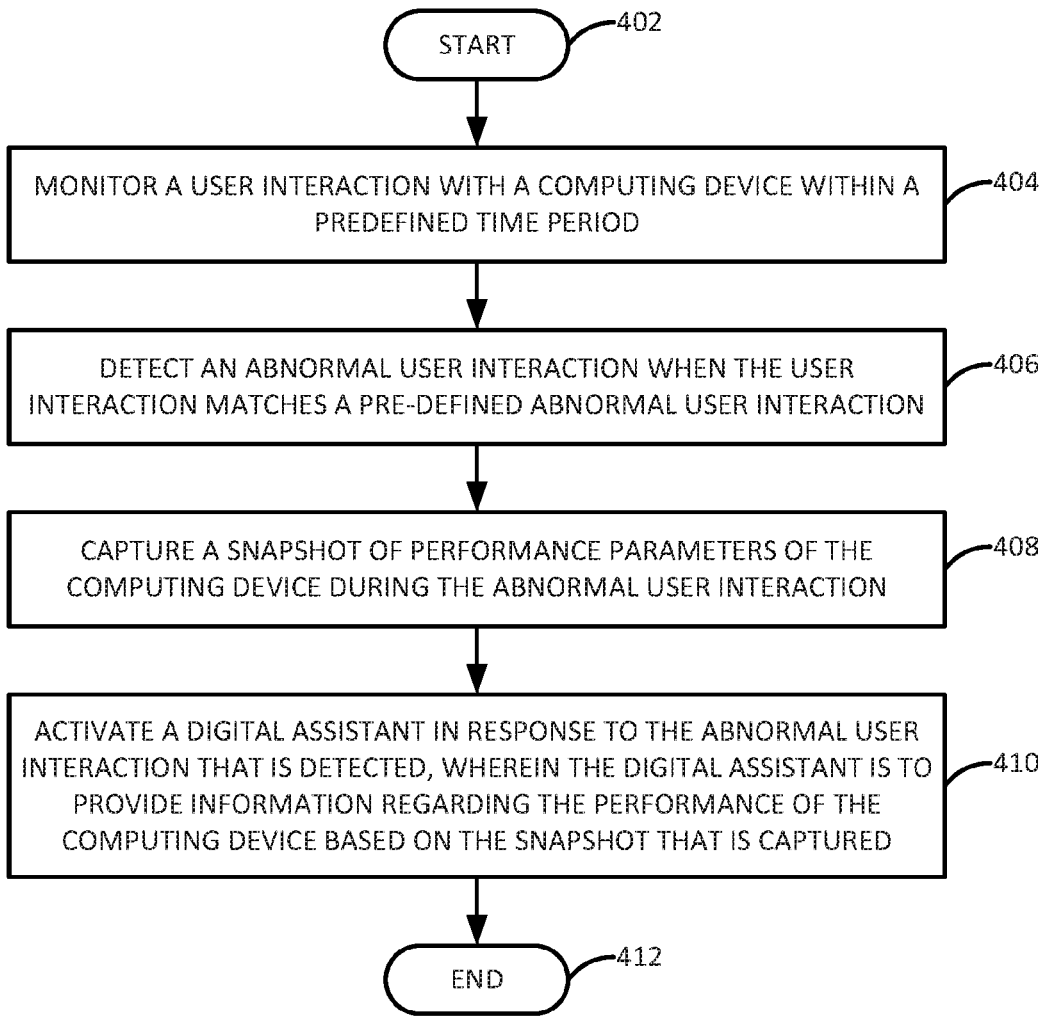
FIG. 4 is a flow chart of an example method for triggering a digital assistant to collect feedback in response to detecting abnormal user interaction of the present disclosure.

FIG. 4 illustrates a flow diagram of an example method 400 for triggering a digital assistant to collect feedback in response to detecting abnormal user interaction. In an example, the method 400 may be performed by any of the computing devices 112 or 122, or the apparatus 500 illustrated in FIG. 5, and described below.

At block 402, the method 400 begins. At block 404, the method 400 monitors a user interaction with the computing device within a predefined time period. As noted above, user interactions with the computing device may be monitored via the computing device itself or a sensor. For example, the computing device may track movements of the mouse, track repetition of a key being pressed, track a plurality of adjacent keys being simultaneously pressed (e.g., a user slapping or slamming the keyboard), track continuous touching of an area of a touch screen display, track repeated insertion and removal of an external device from a USB port, and the like. The computing device may also use a sensor to detect excessive force from slamming the keyboard, punching the monitor, shaking the monitor or computing device, and the like.

At block 406, the method 400 detects an abnormal user interaction when the user interaction matches a pre-defined abnormal user interaction. In one example, the user interactions may be monitored continuously over a predefined time period (e.g., every 30 seconds, every minute, every 5 minutes, every 10 minutes, and so forth). The user interactions may be compared to pre-defined abnormal user interactions that are stored in memory. When a match is detected, the computing device may determine that an abnormal user interaction has been identified.

At block 408, the method 400 captures a snapshot of performance parameters of the computing device during the abnormal user interaction. The snapshot may include a single snapshot or a sequence of snapshots over a predefined time period. In one example, the performance parameters may include parameters such as processor utilization, memory utilization, a list of applications that were being executed, an amount of processor and memory utilization for each application, what external devices were connected, a current network speed, and the like. Additional telemetry data may be collected in addition to the snapshot of performance parameters At block 410, the method 400 activates a digital assistant in response to the abnormal user interaction that is detected, wherein the digital assistant is to provide information regarding the performance of the computing device based on the snapshot that is captured. In one example, the digital assistant may analyze the snapshot of performance parameters to try and determine a possible error or root cause of what caused the abnormal user interaction. For example, the digital assistant may determine that the network connection has been lost, an incompatible application is being executed, a hardware component has failed (e.g., a memory slot, a graphics card, a USB slot, and so forth), or any other possible error.

In one example, the digital assistant may attempt to correct the error before providing information to the user. In another example, the digital assistant may provide information to the user and notify the user about what steps are being taken to correct the possible error before correcting the error.

In one example, the digital assistant may collect a subjective score and user feedback information. In one example, the digital assistant may calculate an overall performance score based on the subjective score and an objective score calculated from the snapshot of performance parameters. In another example, the information may be provided to an application server of a service provider and the service provider may calculate the overall score. In one example, the subjective score and the objective score may be weighted the same or differently to calculate the overall score.

In one example, if the overall score is below a threshold then the computing device may not be operating properly or may not be a good fit for the user's computing needs. The computing device may transmit a notification to the service provider to replace the computing device or conduct a review of the user's computing needs and a capability of the computing device that is currently assigned to the user. When interaction with the user is completed, the digital assistant may terminate. At block 412, the method 400 ends.

Figure 5:
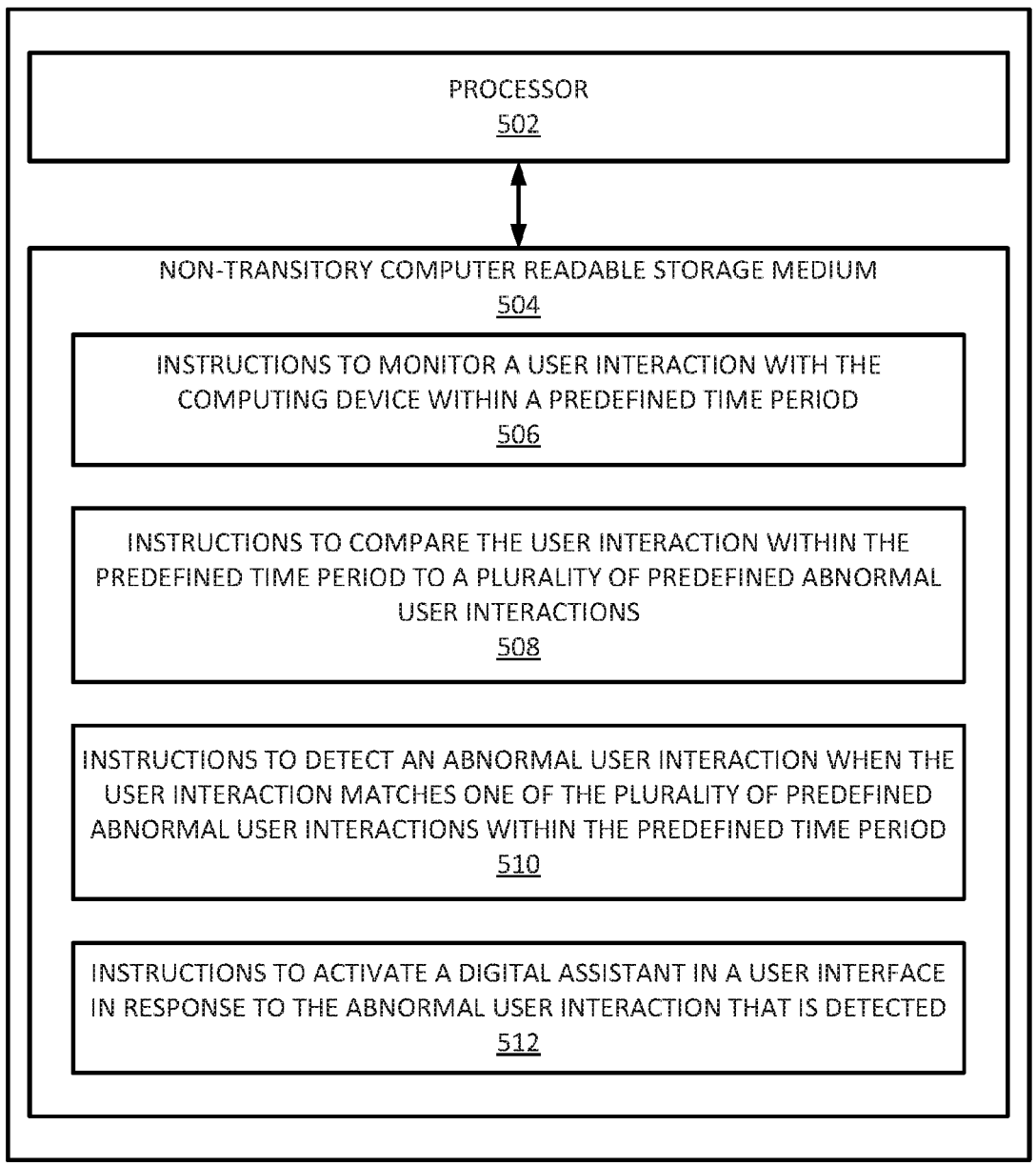
FIG. 5 is a block diagram of an example non-transitory computer readable storage medium storing instructions executed by a processor to trigger a digital assistant to collect feedback in response to detecting abnormal user interaction.

FIG. 5 illustrates an example of an apparatus 500. In an example, the apparatus 500 may be the device 100. In an example, the apparatus 500 may include a processor 502 and a non-transitory computer readable storage medium 504. The non-transitory computer readable storage medium 504 may include instructions 506, 508, 510, and 512 that, when executed by the processor 502, cause the processor 502 to perform various functions.

In an example, the instructions 506 may include instructions to monitor a user interaction with the computing device within a predefined time period. The instructions 508 may include instructions to compare the user interaction within the predefined time period to a plurality of predefined abnormal user interactions. The instructions 510 may include instructions to detect an abnormal user interaction when the user interaction matches one of the plurality of predefined abnormal user interactions within the predefined time period. The instructions 512 may include instructions to activate a digital assistant in a user interface in response to the abnormal user interaction that is detected.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
a processor; and
a non-transitory computer readable medium storing instructions executed by the processor to:
monitor user interaction with the apparatus;
detect an abnormal user interaction with the apparatus;
capture a snapshot of performance parameters of the apparatus during the abnormal user interaction;
activate a digital assistant in response to the abnormal user interaction that is detected;
calculate an overall performance score of the apparatus,
wherein the digital assistant is to provide information regarding the performance of the apparatus based on the snapshot that is captured,
wherein the digital assistant is to collect user feedback information related to the abnormal user interaction, and
wherein the overall performance score comprises an objective score of the apparatus based on the performance parameters and a subjective score based on the user feedback information.

2. The apparatus of claim 1, further comprising:
a communication interface to transmit user feedback collected by the digital assistant to a remote server.

3. The apparatus of claim 1, wherein the abnormal user interaction comprises detecting a number of key depressions greater than a threshold within a predefined time period.

4. The apparatus of claim 1, further comprising:
a sensor in an input device that is communicatively coupled to the processor, wherein the abnormal user interaction is detected when the sensor detects an amount of force greater than a threshold.

5. The apparatus of claim 1, wherein the abnormal user interaction comprises a number of mouse movements above a threshold within a predefined time period.

6. The apparatus of claim 1, further comprising:
an external device interface, wherein the abnormal user interaction comprises detecting a number of insertions in the external device interface greater than a threshold within a predefined time period.

7. The apparatus of claim 1, wherein the non-transitory computer readable medium is to store a plurality of pre-defined abnormal user interactions.

8. A method comprising:
monitoring, by a processor of a computing device, a user interaction with the computing device within a predefined time period;
detecting, by the processor, an abnormal user interaction when the user interaction matches a pre-defined abnormal user interaction;
capturing, by the processor, a snapshot of performance parameters of the computing device during the abnormal user interaction;
activating, by the processor, a digital assistant in response to the abnormal user interaction that is detected; and
calculating, by the processor, an overall performance score of the computing device,
wherein the digital assistant is to provide information regarding the performance of the computing device based on the snapshot that is captured,
wherein the digital assistant is to collect user feedback information, and
wherein the overall performance score comprises an objective score of the computing device based on the performance parameters and a subjective score based on the user feedback information.

9. The method of claim 8, further comprising:
transmitting, by the processor, a notification to a service provider to replace the computing device when the overall performance score is below a threshold.

10. The method of claim 8,
wherein the snapshot of performance parameters indicates an error with the computing device and the digital assistant is activated after the error is corrected,
wherein the digital assistant is to provide information related to the error and how the error was corrected.

11. The method of claim 8,
wherein the snapshot of performance parameters indicates an error with the computing device and the digital assistant is activated to indicate to a user that the error is being corrected before the error is corrected.

12. A non-transitory computer readable storage medium encoded with instructions executable by a processor of a computing device, the non-transitory computer-readable storage medium comprising:
instructions to monitor a user interaction with the computing device within a predefined time period;
instructions to compare the user interaction within the predefined time period to a plurality of predefined abnormal user interactions;
instructions to detect an abnormal user interaction when the user interaction matches one of the plurality of predefined abnormal user interactions within the predefined time period;

instructions to capture a snapshot of performance parameters of the computing device during the abnormal user interactions;

instructions to activate a digital assistant in a user interface in response to the abnormal user interaction that is detected;

instructions to calculate an overall performance score of the computing device, wherein the digital assistant is to provide information regarding the performance of the computing device based on the snapshot that is captured, wherein the digital assistant is to collect user feedback information related to the abnormal user interaction, and wherein the overall performance score comprises an objective score of the computing device based on the performance parameters and a subjective score based on the user feedback information.

13. The non-transitory computer readable storage medium of claim 12, wherein the instructions to monitor comprise receiving signals from a sensor in an input device.

\* \* \* \* \*